(12) United States Patent
Manning

(10) Patent No.: US 9,418,017 B2
(45) Date of Patent: Aug. 16, 2016

(54) HOT MEMORY BLOCK TABLE IN A SOLID STATE STORAGE DEVICE

(71) Applicant: MICRON TECHNOLOGY, INC., Boise, ID (US)

(72) Inventor: Troy Manning, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 130 days.

(21) Appl. No.: 14/263,037

(22) Filed: Apr. 28, 2014

(65) Prior Publication Data

US 2014/0237169 A1 Aug. 21, 2014

Related U.S. Application Data

(63) Continuation of application No. 12/251,640, filed on Oct. 15, 2008, now Pat. No. 8,725,927.

(51) Int. Cl.
*G06F 12/00* (2006.01)
*G06F 13/00* (2006.01)
*G06F 12/10* (2016.01)
*G06F 12/02* (2006.01)
*G06F 12/08* (2016.01)
*G06F 12/12* (2016.01)

(52) U.S. Cl.
CPC ........ *G06F 12/1009* (2013.01); *G06F 12/0246* (2013.01); *G06F 12/0292* (2013.01); *G06F 12/0868* (2013.01); *G06F 12/1027* (2013.01); *G06F 12/123* (2013.01); *G06F 12/122* (2013.01); *G06F 2212/1016* (2013.01); *G06F 2212/1036* (2013.01); *G06F 2212/7201* (2013.01)

(58) Field of Classification Search
None
See application file for complete search history.

(56) References Cited

U.S. PATENT DOCUMENTS

| 6,408,371 | B1 | 6/2002 | Jeddeloh |
| 7,472,226 | B1* | 12/2008 | Emma ................. G06F 12/0864 |
| | | | 711/118 |
| 2001/0012222 | A1 | 8/2001 | Terasaki |
| 2002/0140583 | A1* | 10/2002 | Parenteau ........... H03M 7/3084 |
| | | | 341/51 |
| 2005/0080986 | A1 | 4/2005 | Park |
| 2005/0158085 | A1 | 7/2005 | Murakami et al. |

(Continued)

FOREIGN PATENT DOCUMENTS

JP 2001-142774 5/2001

OTHER PUBLICATIONS

TechTerms.com, Cache, [online] [url=http://www.techterms.com/definition/cache].

(Continued)

*Primary Examiner* — Sean D Rossiter
(74) *Attorney, Agent, or Firm* — Dicke, Billig & Czaja, PLLC

(57) ABSTRACT

Solid state storage devices and methods for populating a hot memory block look-up table (HBLT) are disclosed. In one such method, an indication to an accessed page table or memory map of a non-volatile memory block is stored in the HBLT. If the page table or memory map is already present in the HBLT, the priority location of the page table or memory map is increased to the next priority location. If the page table or memory map is not already stored in the HBLT, the page table or memory map is stored in the HBLT at some priority location, such as the mid-point, and the priority location is incremented with each subsequent access to that page table or memory map.

20 Claims, 5 Drawing Sheets

(56) References Cited

U.S. PATENT DOCUMENTS

| | | |
|---|---|---|
| 2006/0242369 A1* | 10/2006 | Thelen .................. G06F 12/126 711/158 |
| 2006/0265557 A1 | 11/2006 | Peinado et al. |
| 2006/0285397 A1 | 12/2006 | Nishihara et al. |
| 2007/0050548 A1 | 3/2007 | Bali et al. |
| 2008/0005522 A1 | 1/2008 | Paladini et al. |
| 2008/0082729 A1 | 4/2008 | Moon et al. |
| 2008/0140897 A1 | 6/2008 | Ganguly |
| 2008/0168253 A1 | 7/2008 | Garrison |
| 2008/0189495 A1 | 8/2008 | McBrearty et al. |
| 2009/0049272 A1 | 2/2009 | Brunheroto et al. |
| 2009/0113135 A1 | 4/2009 | Cain et al. |
| 2009/0158085 A1* | 6/2009 | Kern .................. G06F 11/1064 714/6.13 |

OTHER PUBLICATIONS

Andrew S. Tanenbaum, Modern Operating Systems, 2001, Prentice-Hall, Inc., Second Edition, pp. 218-219.

* cited by examiner

HOT MEMORY BLOCK TABLE IN A SOLID STATE STORAGE DEVICE

RELATED APPLICATION

This application is a continuation of U.S. application Ser. No. 12/251,640, titled "HOT MEMORY BLOCK TABLE IN A SOLID STATE STORAGE DEVICE," filed Oct. 15, 2008 and issued as U.S Pat. No. 8,725,927 on May 13, 2014, which is commonly assigned and incorporated in its entirety herein by reference.

FIELD

The present invention relates generally to memory devices and in a particular embodiment the present invention relates to non-volatile memory devices.

BACKGROUND

Memory devices can include internal, semiconductor, integrated circuits in computers or other electronic devices. There are many different types of memory including random-access memory (RAM), read only memory (ROM), dynamic random access memory (DRAM), static RAM (SRAM), synchronous dynamic RAM (SDRAM), and non-volatile memory (e.g., flash memory).

Flash memory devices have developed into a popular source of non-volatile memory for a wide range of electronic applications. Flash memory devices typically use a one-transistor memory cell that allows for high memory densities, high reliability, and low power consumption. Common uses for flash memory include personal computers, personal digital assistants (PDAs), digital cameras, and cellular telephones. Program code and system data such as a basic input/output system (BIOS) are typically stored in flash memory devices for use in personal computer systems.

Flash memory devices can also be incorporated into solid state storage devices such as solid state drives. A solid state drive is comprised of multiple flash packages where each package can be comprised of many memory dies. Solid state drives are used in computers to replace the hard disk drives that typically have used magnetic or optical disks for storing large amounts of data. A solid state drive does not need to use moving parts whereas a hard disk drive requires a complex and sensitive drive and read/write head assembly to interact with the magnetic/optical disk. Thus, the solid state drives are more resistant to damage and loss of data through vibration and impacts.

A Flash Translation Layer (FTL) in the solid state drive works in conjunction with an operating system to make the solid state drive appear to the operating system as a disk drive. This is accomplished by the FTL creating virtual small blocks of data, also known as sectors, out of flash erase blocks. The FTL also manages and maps data on the solid state drive so that it appears to the system to be written in a certain location when in fact it is being stored, for wear leveling purposes, in different locations throughout the flash memory.

The FTL performs these tasks by generating and maintaining large tables in memory to map host requests to one sector of a disk drive to the actual location of data in the flash memory dies of the solid state drive. These tables can be so large that the system RAM cannot hold them and the flash memory has to be used as overflow memory to hold portions of the tables. Accessing these tables in flash memory can degrade system performance since read and write operations to flash memory require more time than read and write operations to RAM.

For the reasons stated above, and for other reasons stated below that will become apparent to those skilled in the art upon reading and understanding the present specification, there is a need in the art for a more efficient Flash Translation Layer.

DETAILED DESCRIPTION

Figure 1:
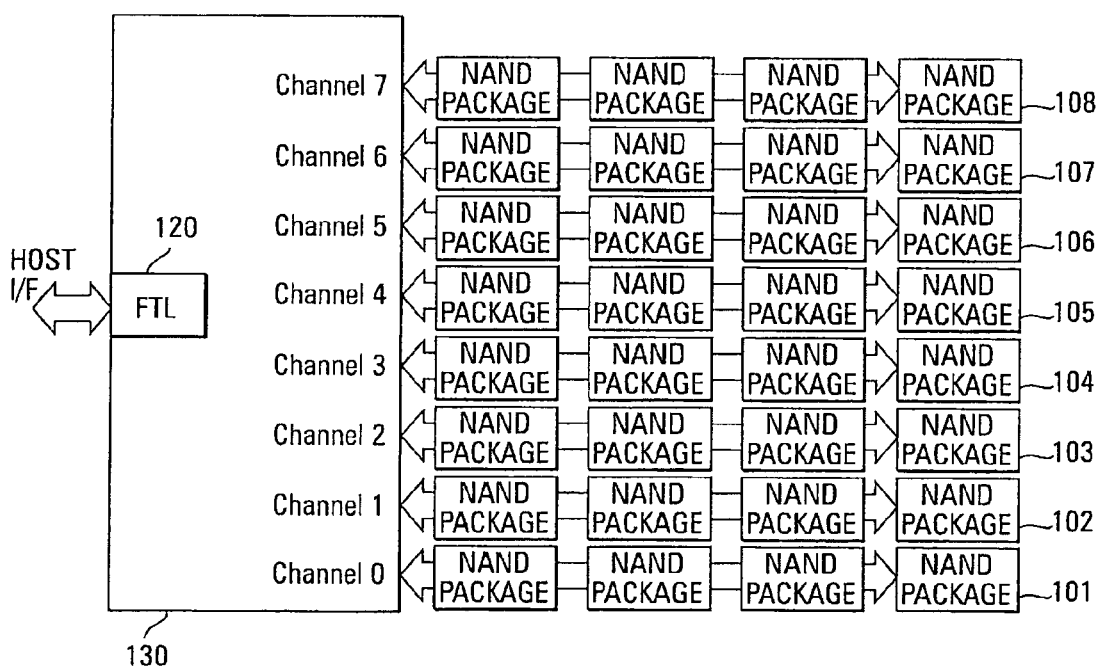
FIG. 1 shows a solid state drive that incorporates a Flash Translation Layer.

In the following detailed description of the invention, reference is made to the accompanying drawings that form a part hereof and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

FIG. 1 illustrates a block diagram of one embodiment of a solid state drive that incorporates a Flash Translation Layer (FTL) 120 that uses a hot memory block look-up table. In one embodiment, the hot memory block look-up table is part of the FTL.

The drive of FIG. 1 is comprised of a controller 130, having eight communication channels 101-108, that executes the FTL 120. Each channel 101-108 is connected to four stacked memory packages. These devices are illustrated as NAND memory packages. Alternate embodiments can use other types of solid state memory.

Each stacked NAND memory package, also referred to as a logical unit (LUN), can be accessed in a parallel manner and is subsequently referred to as a parallel unit (PU). Each PU may be assigned a unique number or some other unique identifier. As described subsequently with reference to FIGS. 4 and 5, each PU or other memory unit is assigned its own hot memory block look-up table.

Each logical unit might share the same chip select (CE) signal so that each logical unit is accessed by an address bit to distinguish the multiple dies in the package. The multiple dies may operate in parallel on different commands at the same time. In other words, one die might be experiencing a write operation while another is experiencing a read operation. Each memory die of the package may be assigned to a different plane within the package.

Figure 2:
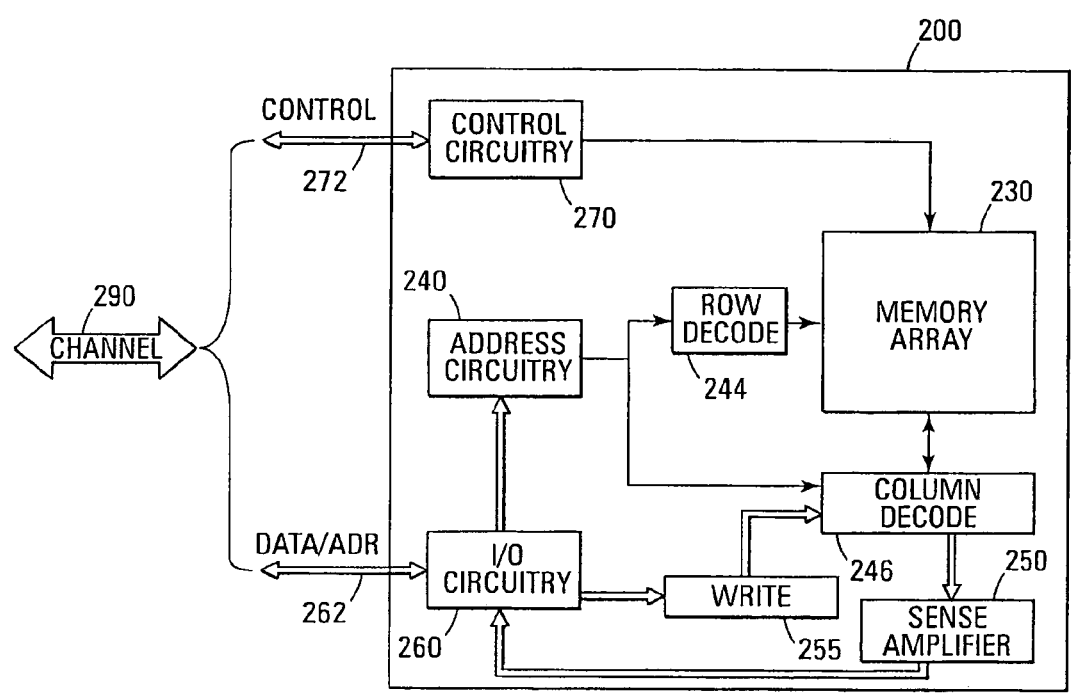
FIG. 2 shows a block diagram of one embodiment of a non-volatile memory device, in accordance with the solid state drive of FIG. 1, that incorporates a flash memory array and a memory communication channel.

FIG. 2 illustrates a functional block diagram of a non-volatile memory device 200 that can be incorporated on an integrated circuit die. The non-volatile memory device 200, in one embodiment, is flash memory.

Figure 3:
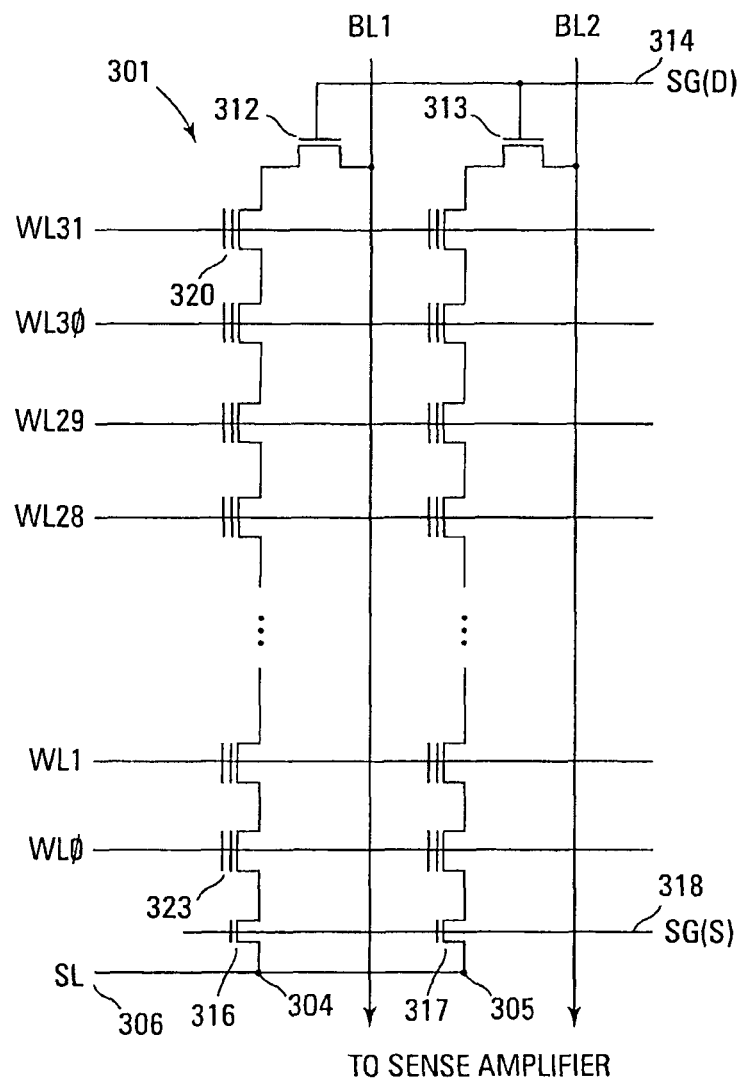
FIG. 3 shows a schematic diagram of one embodiment of a portion of a non-volatile memory array in accordance with the non-volatile memory devices of FIGS. 1 and 2.

The non-volatile memory device 200 includes an array 230 of non-volatile memory cells such as the floating gate memory cells that are illustrated in FIG. 3 and discussed subsequently. The memory array 230 is arranged in banks of access line (e.g., word line) rows and data line (e.g., bit line) columns. In one embodiment, the columns of the memory array 230 are comprised of series strings of memory cells. As is well known in the art, the connections of the cells to the bit lines determines whether the array is a NAND architecture, an AND architecture, or a NOR architecture.

The memory array 230 can be organized into memory blocks. The quantity of memory blocks is typically determined by the size of the memory device (i.e., 512 MB, 1 GB). In one embodiment, each memory block is organized into 64 pages.

Address buffer circuitry 240 is provided to latch address signals provided through the I/O circuitry 260. Address signals are received and decoded by a row decoder 244 and a column decoder 246 to access the memory array 230. It will be appreciated by those skilled in the art, with the benefit of the present description, that the number of address input connections depends on the density and architecture of the memory array 230. That is, the number of addresses increases with both increased memory cell counts and increased bank and block counts. Data is also input and output through the I/O circuitry 260 based on the timing of the control signals 272.

The non-volatile memory device 200 reads data in the memory array 230 by sensing voltage or current changes in the memory array columns using sense amplifier circuitry 250. The sense amplifier circuitry 250, in one embodiment, is coupled to read and latch a row of data from the memory array 230. I/O circuitry 260 is included for bidirectional data communication as well as address communication over a plurality of data connections 262 with an external controller. Write circuitry 255 is provided to write data to the memory array.

The memory control circuitry 270 decodes signals provided on control bus 272 from an external controller. These signals can include read/write (R/$\overline{W}$), chip enable (CE), command latch enable (CLE), address latch enable (ALE) as well as other control signals that are used to control the operations on the memory array 230 as well as other circuitry of the memory device 200. In one embodiment, these signals are active low but alternate embodiments can use active high signals. The memory control circuitry 270 may be a state machine, a sequencer, or some other type of controller to generate the memory control signals.

The non-volatile memory device 200 communicates with an external controller over the communication channel 290, as illustrated in FIG. 1. In one embodiment, the channel 290 is comprised of the memory address, data, and control signals between the solid state drive controller and the memory device 200. The embodiment of FIG. 2 shows the address and data being coupled as one bus to the I/O circuitry 260. In an alternate embodiment, the address and data buses are separate inputs/outputs with the memory device 200.

FIG. 3 illustrates a schematic diagram of a portion of a NAND architecture memory array comprising series strings of non-volatile memory cells. While the subsequent discussions refer to a NAND memory device, the present embodiments are not limited to such an architecture.

The memory array is comprised of an array of non-volatile memory cells 301 (e.g., floating gate) arranged in columns such as series strings 304, 305. Each of the cells 301 is coupled drain to source in each series string 304, 305. A word line WL0-WL31 that spans across multiple series strings 304, 305 is connected to the control gates of each memory cell in a row in order to bias the control gates of the memory cells in the row. Bit lines BL1, BL2 are eventually connected to sense amplifiers (not shown) that detect the state of each cell by sensing current on a particular bit line.

Each series string 304, 305 of memory cells is coupled to a source line 306 by a source select gate 316, 317 and to an individual bit line BL1, BL2 by a drain select gate 312, 313. The source select gates 316, 317 are controlled by a source select gate control line SG(S) 318 coupled to their control gates. The drain select gates 312, 313 are controlled by a drain select gate control line SG(D) 314.

Each memory cell can be programmed as a single level cell (SLC) or multilevel cell (MLC). Each cell's threshold voltage ($V_t$) is indicative of the data that is stored in the cell. For example, in an SLC, a $V_t$ of 0.5V might indicate a programmed cell while a $V_t$ of −0.5V might indicate an erased cell. The MLC may have multiple $V_t$ windows that each indicate a different state. Multilevel cells can take advantage of the analog nature of a traditional flash cell by assigning a bit pattern to a specific voltage range stored on the cell. This technology permits the storage of two or more bits per cell, depending on the quantity of voltage ranges assigned to the cell.

Figure 4:
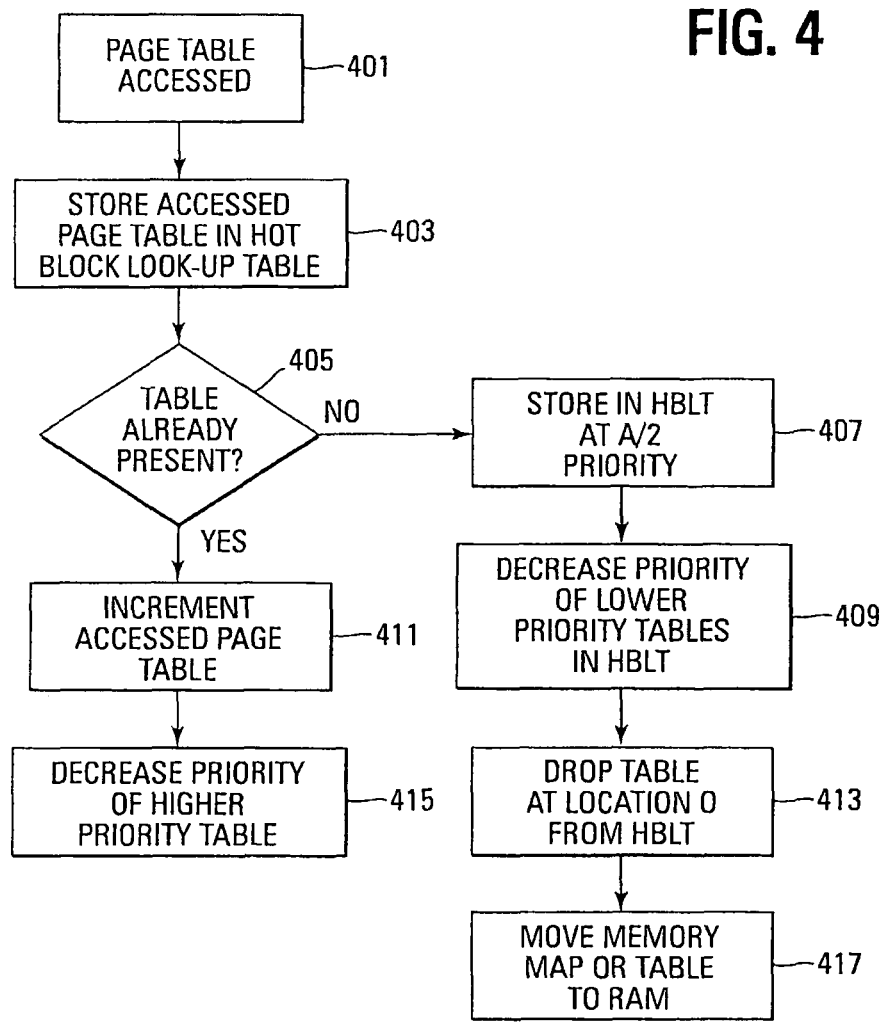
FIG. 4 shows a flowchart of one embodiment of a method for populating a hot memory block look-up table.

FIG. 4 illustrates a flowchart of one embodiment of a method for populating a hot memory block look-up table for a solid state memory device, such as the solid state drive of FIG. 1. The table is used to track which memory blocks of an associated parallel unit are considered "hot" (i.e., used more often than other blocks). The "hot" portions of the memory map that the FTL uses for mapping a received disk drive sector to a memory erase block are moved into RAM from an over-flow area in non-volatile memory. This enables the maps that are used more often to be accessed more rapidly from the higher speed RAM than from the slower speed flash memory.

A page table or memory map of a flash memory block containing the location of sectors (e.g., logical block addresses) of data to be translated by the FTL is initially accessed 401 by the FTL. A pointer to this particular page table is then stored in the hot memory block look-up table 403. It is assumed for subsequent discussion that the hot memory block look-up table is comprised of a quantity of "A" entries from 0 to A where A is the table with the highest priority and 0 is the table with the lowest priority.

If the accessed table is not already present in the hot memory block look-up table 405, it is stored in the hot memory block look-up table with an initial priority of A/2 407. Alternate embodiments may store the accessed table with some other initial priority than A/2. The tables that are already stored in the hot memory block look-up table with a lower priority than A/2 are then decreased in priority 409. The table that was at priority 0 is then dropped from the hot memory block look-up table 413. Using the present method, the hot memory block look-up table is constantly being updated with higher priority tables/maps while the lower priority tables/maps are dropped and the corresponding map/page table is moved out of the higher speed RAM area. The page table or memory map of the flash memory block Containing the location of sectors of data to be translated by the FTL are moved from an overflow area in slower non-volatile memory to the faster RAM 417.

If the accessed table is already present in the hot memory block look-up table 405, the priority of this table is incremented 411. When the accessed table is moved up in priority, the lowest priority table above A/2 is then moved down 415. For example, if the accessed table was at priority A/2 and it was accessed a second time, it would now be at priority location A/2+1 and the table that had previously occupied the A/2+1 location would then be decreased in priority to location A/2. This would continue until the accessed table is at location A, the highest priority location of the hot memory block look-up table. Since, in this case, no new tables have been added, there is not a need to drop the previous priority location 0 table since it remains at location 0.

Figure 5:
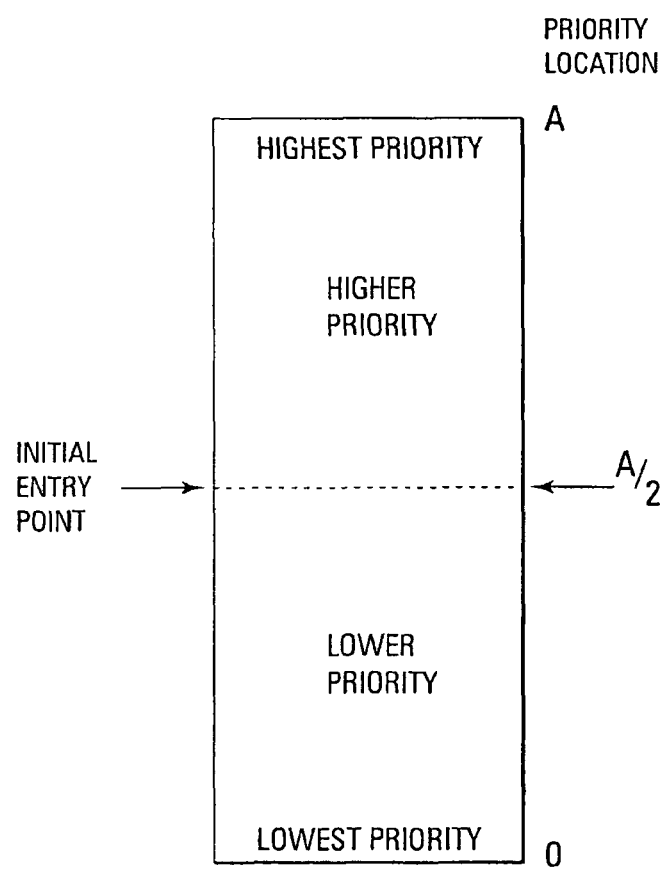
FIG. 5 shows one embodiment of a hot memory block look-up table in accordance with the populating method of FIG. 4.

FIG. 5 illustrates one embodiment of a hot memory block look-up table as generated by the method of FIG. 4. Each entry of the hot memory block look-up table comprises a page table or memory map pointer to a flash memory block in an associated parallel unit or other memory unit. The entries are ordered from the lowest priority at the 0 priority location to the highest priority at the A priority location. As previously described, the initial entry point is the mid point (i.e., A/2) priority location of the table.

Conclusion

In summary, one or more embodiments of the hot block look-up table for a solid state memory device provide quicker access to page tables or memory maps of a NAND flash memory block in a parallel unit associated with the hot memory block look-up table. An initially accessed memory map is entered into the table at the mid-point of A/2 and is moved up the table priority locations each time it is accessed. The portion of the map that is pointed to by the look-up table entry is moved from the lower speed non-volatile memory to the higher speed RAM.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A method of operating a solid state memory device, the method comprising:
storing an indication of a first memory map at a first one of a plurality of priority locations in a memory block look-up table in response to the first memory map being accessed, wherein the first memory map contains a plurality of first logical block addresses of data to be translated by a translation layer; and
storing an indication of a second memory map at a second one of the plurality of priority locations, having a priority that is different than the first one of the plurality of priority locations, in response to the second memory map being accessed, wherein the second memory map contains a plurality of second logical block addresses of data to be translated by the translation layer.

2. The method of claim 1, wherein storing the indication of the second memory map at the second one of the plurality of priority locations comprises storing the indication of the second memory map at a mid-point priority location of the plurality of priority locations.

3. The method of claim 1, further comprising moving the indication of the first memory map from the first one of the plurality of priority locations to a third one of the plurality of priority locations having priority that is less than the priority of the second one of the plurality of priority locations.

4. The method of claim 1, further comprising removing the indication of the first memory map from the memory block look-up table in response to storing the indication of the second memory map at the second one of the plurality of priority locations.

5. The method of claim 1, further comprising moving the indication of the second memory map from the second one of the plurality of priority locations to a third one of the plurality of priority locations having a higher priority than the second one of the plurality of priority locations for a subsequent access to the second memory map.

6. The method of claim 1, wherein the indication of the first memory map is a pointer to the first memory map and wherein the indication of the second memory map is a pointer to the second memory map.

7. The method of claim 1, further comprising moving the first memory map to a memory location having a faster access time from a memory location having a slower access time in response to storing the indication of the first memory map at the first one of a plurality of priority locations.

8. The method of claim 7, wherein moving the first memory map to the memory location having the faster access time from the memory location having the slower access time comprises moving the first memory map to RAM from non-volatile memory.

9. The method of claim 1, wherein the first memory map having the indication stored at the first one of the plurality of priority locations and the second memory map having the indication stored at the second one of the plurality of priority locations are both accessed more frequently than a memory map that does not have an indication in the memory block look-up table.

10. A method of operating a solid state memory device, the method comprising:
moving an indication of a memory map in a memory look-up table from a first one of a plurality of priority locations in the memory look-up table to a second one of the plurality of priority locations having a higher priority than the first one of the plurality of priority locations in response to the memory map being accessed, wherein the memory map contains a plurality of logical block addresses of data to be translated by a translation layer.

11. The method of claim 10, wherein the memory map is a first memory map, and further comprising moving an indication of a second memory map in the memory look-up table to the first one of the plurality of priority locations from the second one of the plurality of priority locations in response to moving the indication of the first memory map from the first one of the plurality of priority locations to the second one of the plurality of priority locations, wherein the second memory map contains a plurality of logical block addresses of data to be translated by the translation layer.

12. An apparatus, comprising:
a controller comprising a translation layer;
wherein the controller is configured to store an indication of a first memory map in a first one of a plurality of priority locations in a memory block look-up table in response to the first memory map being accessed, wherein the first memory map contains a plurality of first logical block addresses of data to be translated by the translation layer; and wherein the controller is configured to store an indication of a second memory map at a second one of the plurality of priority locations, having a priority that is different than the first one of the plurality of priority locations, in response to the second memory map being accessed, wherein the second memory map contains a plurality of second logical block addresses of data to be translated by the translation layer.

13. The apparatus of claim 12, wherein the controller is configured to remove the indication of first memory map from the memory block look-up table in response to the indication of the second memory map being stored at the second one of the plurality of priority locations.

14. The apparatus of claim 12, wherein the controller is configured to move the indication of the first memory map from the first one of the plurality of priority locations to a third one of the plurality of priority locations having a lower priority than the first one of the plurality of priority locations in response to the first one of the plurality of priority locations having a lower a priority than the second one of the plurality of priority locations.

15. The apparatus of claim 12, wherein the controller is configured to move the indication of the second memory map from the second one of the plurality of priority locations to a third one of the plurality of priority locations having a higher priority than the second one of the plurality of priority locations for a subsequent access to the second memory map.

16. The apparatus of claim 12, wherein the memory block look-up table is part of the translation layer.

17. The apparatus of claim 12, wherein the memory block look-up table is executed by the translation layer.

18. The apparatus of claim 12, wherein the controller is further configured to move the first memory map to a memory location having a faster access time from a memory location having a slower access time in response to storing the indication of the first memory map at the first one of the plurality of priority locations.

19. An apparatus, comprising:
a controller comprising a translation layer;
wherein the controller is configured to move an indication of the memory map in a memory look-up table from a first one of a plurality of priority locations in the memory look-up table to a second one of the plurality of priority locations, having a higher priority than the first one of the plurality of priority locations, in response to the memory map being accessed, wherein the memory map contains a plurality of logical block addresses of data to be translated by the translation layer.

20. The apparatus of claim 19, wherein the memory map is a first memory map, and wherein the controller is configured to move an indication of a second memory map in the memory look-up table to the first one of the plurality of priority locations from the second one of the plurality of priority locations in response to the indication of the first memory map being moved from the first one of the plurality of priority locations to the second one of the plurality of priority locations, wherein the second memory map contains a plurality of logical block addresses of data to be translated by the translation layer.

* * * * *